Aug. 12, 1969  W. R. BROWN  3,460,387
IN-FLUME TRANSMITTER
Filed May 22, 1967  4 Sheets-Sheet 1
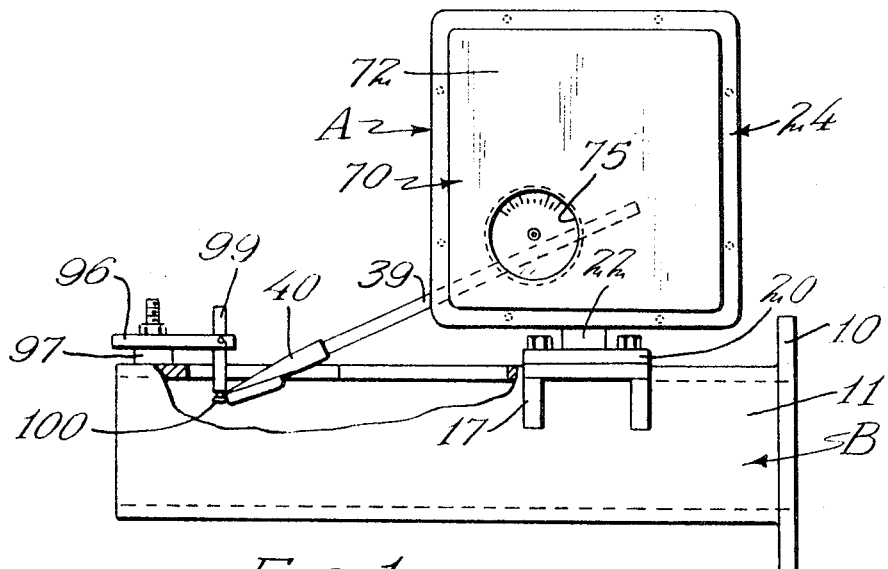
FIG. 1
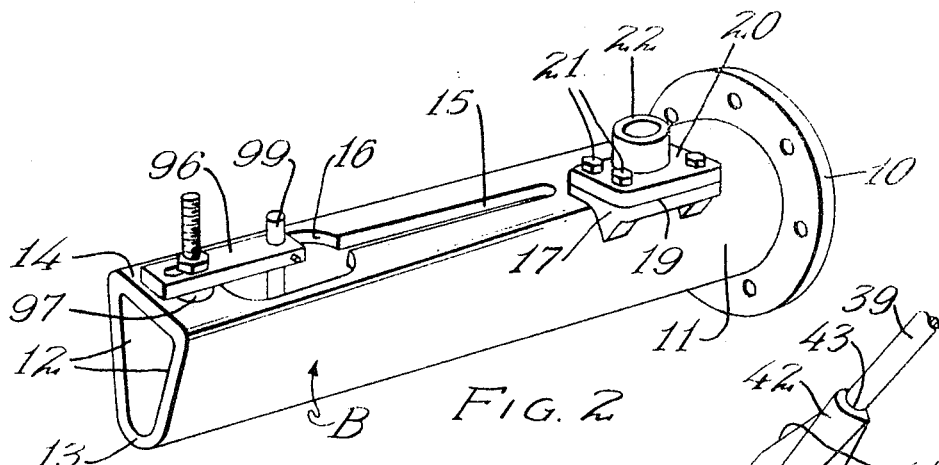
FIG. 2
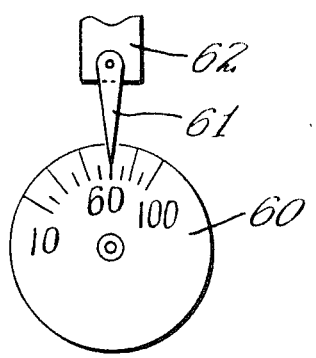
FIG. 3
FIG. 4
INVENTOR
WILLIAM R. BROWN
BY Robert M. Dunning
ATTORNEY Aug. 12, 1969   W. R. BROWN   3,460,387
IN-FLUME TRANSMITTER Filed May 22, 1967   4 Sheets-Sheet 2

INVENTOR
WILLIAM R. BROWN

INVENTOR
WILLIAM R. BROWN

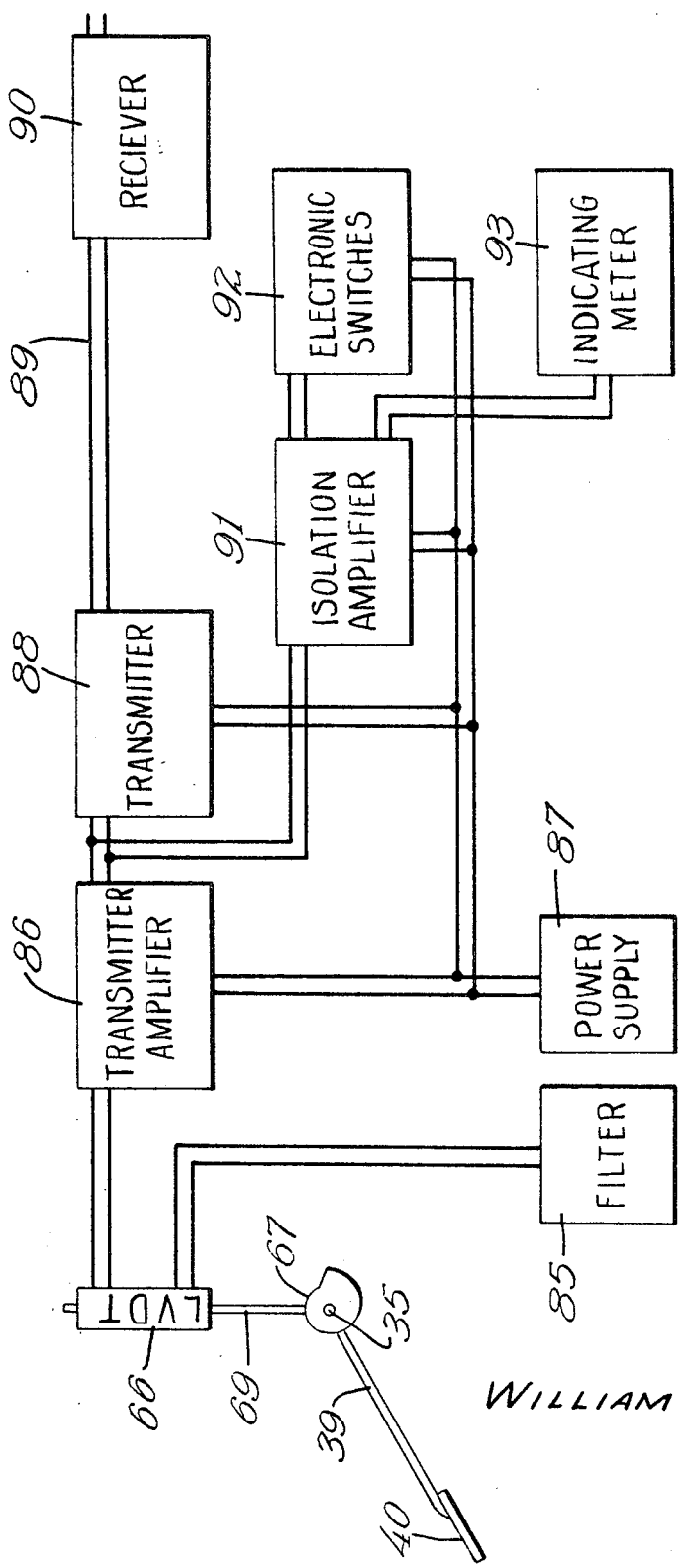
F/G. 8

United States Patent Office 3,460,387
Patented Aug. 12, 1969

3,460,387
IN-FLUME TRANSMITTER
William R. Brown, St. Paul, Minn., assignor, by mesne assignments, to Control Data Corporation, Minneapolis, Minn., a corporation of Minnesota
Filed May 22, 1967, Ser. No. 640,104
Int. Cl. G01f 23/06
U.S. Cl. 73—313         10 Claims

ABSTRACT OF THE DISCLOSURE

This invention resides in an apparatus for measuring flow of sewage or the like through an open flume. The apparatus includes a sealed housing having a horizontal shaft projecting therefrom on which is supported a ski supporting arm. The ski rides on the surface of the flowable material and changes in flow act through the arm to pivot the shaft. The shaft preferably drives a parallel shaft on which is supported a cam. The cam actuates the core of a linear variable differential transformer which varies the voltage supply input to a transmitter. The transmitter is a solid state impulse transmitter which produces equally spaced pulses of a duration which varies with the voltage supplied. The signal is transmitted to a receiver to convert the pulses to voltage. The device may also include solid state switches for alarm circuits and the like. A temperature controlled heater may be provided in the housing to prevent condensation.

Summary of the invention

This invention relates to an improvement in in-flume transmitters and deals particularly with an apparatus useful in the measuring of the flow of sewage or other semi-liquid materials through a passageway, such as a parabolic flume.

In general, the apparatus comprises a sealed housing which is attached to a section of the flume, and from which a substantially horizontal shaft extends. A plastic float or "ski" sensor is attached to the shaft and extends into the flume to rise and fall with the level flow in the flume. The rise and fall of the flow in the flume causes a corresponding movement of the ski which acts to rotate the shaft extending into the housing.

On the interior of the housing, the rotation of the shaft normally acts through cooperable gears to cause corresponding movement of a parallel counter shaft. This parallel shaft is equipped with a cam. A linear variable differential transformer, usually known as a LVDT is provided with a slidable core which is moved longitudinally by movement of the cam. The cam is shaped to operate the LVDT in a manner to produce a linear voltage signal which is proportional to the flow of material through the flume.

A feature of the present invention resides in the provision of a solid state impulse transmitter which is actuated by movements of the LVDT. The sealed housing includes a card box designed to accommodate a plurality of plug-in printed circuit boards which control the various signals from the apparatus. Current for actuating the device is supplied from a power line which delivers current to the suitable plug-in units of the card box.

A feature of the present invention resides in the provision of a power supply unit in the form of a solid state plug-in board which receives line voltage such as 120 volt 60 cycle current, and delivers current of the desired voltage to the proper elements. For example, the excitation voltage for the LVDT is furnished from the power line through an electronic plug-in filter board which is another printed circuit unit. When the LVDT slug is actuated by the cam, the resulting linear voltage output is directly proportional to the flow of the measured liquid.

A further feature of the present invention resides in the provision of a transmitter which also is supported upon a plug-in printed circuit board mounted in the card box. The transmitter comprises a solid state time impulse transmitter which converts the input voltage into a series of uniformly spaced signal pulses which vary in width in proportion to the input signal. As an example, the output pulses may each start 90 milliseconds after the start of the preceding pulse, and the width of each pulse may vary from 15 milliseconds to 75 milliseconds in length, depending upon the input from the LVDT. These DC pulses are transmitted through an amplifier to a transmission line, and to a suitable receiving unit which transforms the pulses into a DC current corresponding in voltage to the width of the pulses. This voltage is employed to actuate a suitable indicating device to provide a remote indicator which is capable of indicating the rate of flow of fluid through the flume.

A feature of the present invention resides in the provision of the device of the type described in which the flow of the fluid acts to rotate a shaft, and in which the shaft rotation is amplified by means of suitable gearing. A parallel shaft supports a cam which is characterized to produce a linear motion of the LVDT slug and a resulting linear voltage output of the LVDT which is directly proportional to the flow of the measured liquid. Thus the input voltage to the time impulse transmitter is directly proportional to the fluid flow, and the width of the pulses produced by the time impulse transmitter are therefor also directly proportional to the fluid flow.

A further feature of the present invention resides in the provision of an apparatus of the type described including a fixture which may be used to automatically locate the ski at the 60% capacity point while the transducer is being set. Through the use of this fixture, the indicator may be set in proper relation to the ski, eliminating the necessity of inserting the hands into the flume while a reference point is being set on the transducer.

A further feature of the present invention resides in the provision of a device of the type described and which includes trimming potentiometers for adjusting both the zero point and the span of operation of the device thus the zero and maximum level readings are completely adjustable, eliminating a mechanical structure such as a gearing to accomplish this adjustment.

An additional feature of the present invention resides in the fact that additional elements are available such as solid state plug in switches for controlling an alarm, for activating transmission line failure alarm contacts, and for providing condensation protection. When such available options are included, an alarm may be provided in the event the transmission line fails or a thermoplastic controlled resistance heater may provide heat within the casing to the extent necessary to eliminate condensation.

These and other objects and novel features of the present invention will be more clearly and fully set forth in the following specification and claims.

Description of the drawings

FIGURE 1 is a side elevational view of the influme transmitter, a portion of the structure being broken away to indicate the manner in which a device is set.

FIGURE 2 is a perspective view of the flume with the initial setting apparatus in place thereupon.

FIGURE 3 is a diagrammatic view showing the indicator and the position thereof when the ski is in the position indicated in FIGURE 1 of the drawings.

FIGURE 4 is a perspective view of the ski itself.

FIGURE 8 is a diagram of the transmitter system.

Description of the invention

Figure 5:
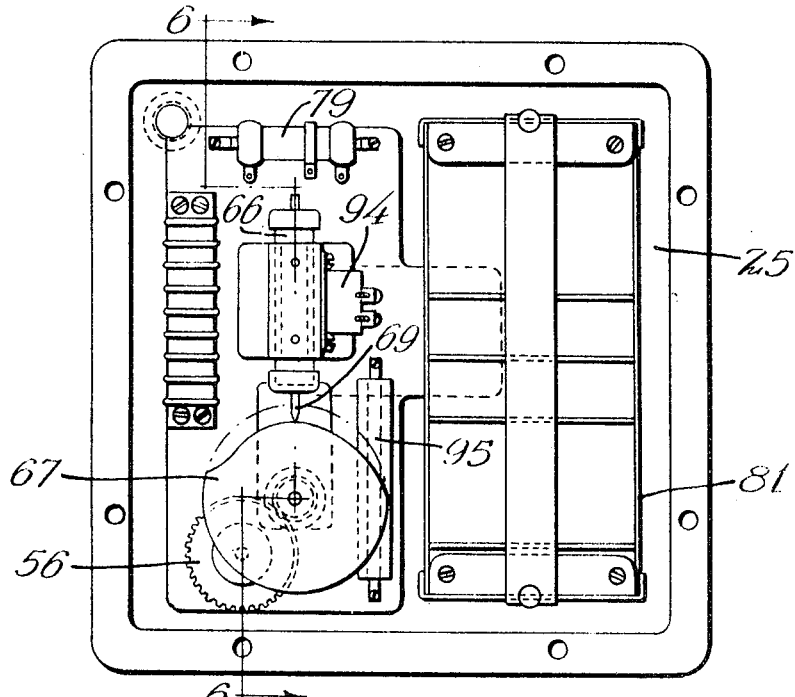
FIGURE 5 is a elevational view of the apparatus with the housing cover removed.

The in-flume transmitter is indicated in general by the letter A, and is preferably mounted in a section of flume which is indicated in general by the letter B. As is indicated, the flume section B includes a mounting flange 10 at one end thereof, and the flume is usually cylindrical at the end 11 thereof which adjoins flange 10, and gradually tapers into a generally U-shaped form with upwardly diverging sides 12, a rounded bottom surface 13, and a substantially flat top 14. The flat top 14 is provided with an elongated slot 15 therein which is adapted to accommodate the arm of the ski, the slot 15 having an enlarged end extremity 16 which is designed to accommodate the fluid engaging end of the ski.

Figure 6:
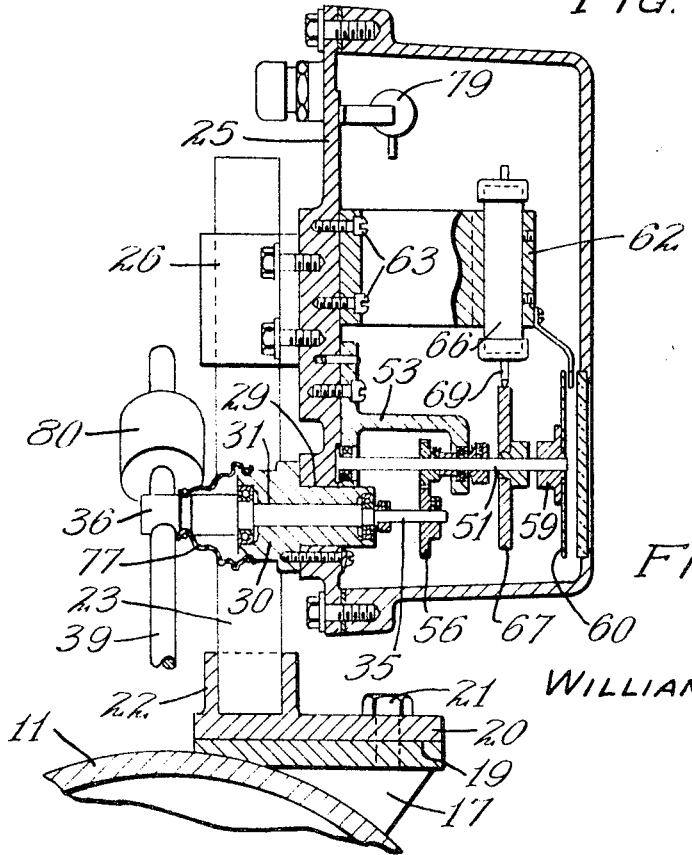
FIGURE 6 is a vertical sectional view through the housing, the position of the section being indicated by the line 6—6 of the FIGURE 5.

The flume B is provided at its cylindrical end 11 with a bracket 17 which preferably is provided with a horizontal upper surface 19. A flange 20 is bolted or otherwise secured to the bracket 17 as indicated at 21 and supports sleeve 22 arranged on a vertical axis and designed to accommodate a supporting standard 23 as indicated in FIGURE 6 of the drawings.

The transducer housing which is indicated in general by the numeral 24 is provided with a mounting plate 25 to which is secured a flanged sleeve 26, the axis of which is vertical, and which is designed to accommodate the standard 23. The flanged sleeve is attached to the mounting plate 25 by bolts 27 or other suitable means. The lower portion of the mounting plate 25 is provided with a cylindrical aperture 29 extending therethrough, the axis of the aperture being substantially horizontal. The aperture 29 is designed to accommodate a bearing sleeve 30 having a central axial aperture 31 extending therethrough, having spaced bearings 32 and 33 at opposite ends thereof. The bearings 32 and 33 support the intermediate portions 34 of an operating shaft 35 extending through the mounting plate. The large diameter outer end 36 of the shaft 35 is apertured as indicated at 37 to accommodate an arm 39 which supports at its outer end a ski 40. The ski 40 comprises in general a flat blade having forwardly tapering sides 41 which are on opposite sides of a boss 42 having a socket 43 in its upper end to accommodate the arm 39. The undersurface of the ski 40 is provided with a pair of parallel blades 44 which act to confine a certain amount of the fluid therebetween.

The large diameter end 36 of the shaft 35 is provided with a hub 45 having a peripheral flange 46 thereupon which supports a concentric sleeve 47 encircling the outward end of the bearing support 30. A viscous silicone fluid 49 is provided between the sleeve 47 and the surface of the fixed bearing support 30, this silicone fluid acting as a mechanical damping agent to prevent rapid fluctuations of the shaft 35. The bearing support 30 is connected to the mounting plate 25 by bolts 50 or other suitable means.

A counter-shaft 51 is supported in parallel relation to the shaft 30 by a bearing 52 mounted in the bracket 53 adjoining the mounting plate 25, and by a second outboard bearing 58 mounted upon an L-shaped arm 54 forming a part of the bracket 53. The small diameter inner end 55 of the shaft 35 is provided with a gear 56 which is in mesh with a smaller diameter gear 57 on the counter shaft 51. Thus the rotation of the shaft 35 is substantially magnified in rotation of the shaft 51. A hub 59 on the shaft 51 supports an indicator dial 60 which rotates relative to a fixed pointer 61 mounted upon a supporting bracket 62 bolted or otherwise secured to the mounting plate 25 as indicated at 63. The dial 60 is provided with suitable gauge marks which may be used to indicate the percentage of flow through the flume B.

A dust cover 64 encircles the outwardly projecting end of the bearing support 30 and the sleeve 47, and a rubber boot 65 is provided to seal the joint between the dust cover sleeve 64 and the outer end of the shaft 35, inwardly of the arm 37.

A linear variable differential transformer 66 which is commonly known as an LVDT is supported by the bracket 66 directly above the shaft 51. A cam 67 is mounted upon the counter-shaft 51, the cam being characterized to produce a linear motion of the LVDT slug upon rotation of the shaft 35 by the arm 39. The LVDT slug is actuated by a plunger 69 which rises upon the surface of the cam 67 and moves the slug vertically. A voltage which is proportional to the fluid flow is provided as an output from the LVDT 66.

A housing cover 70 is mounted upon the mounting plaet 25 by means of bolts 71 or other suitable fastening means. The cover 70 is provided with a vertical wall 72 parallel to the mounting plate 25, and the peripheral side walls 73 which terminate in an enlarged peripheral rim 74 into which the fastening bolts extend. The cover 70 is preferably provided with an aperture 75 outwardly of the indicator dial 60 which is closed by a suitable transparent closure 76. The dial 60 may be viewed through this transparent plate 76.

Figure 7:
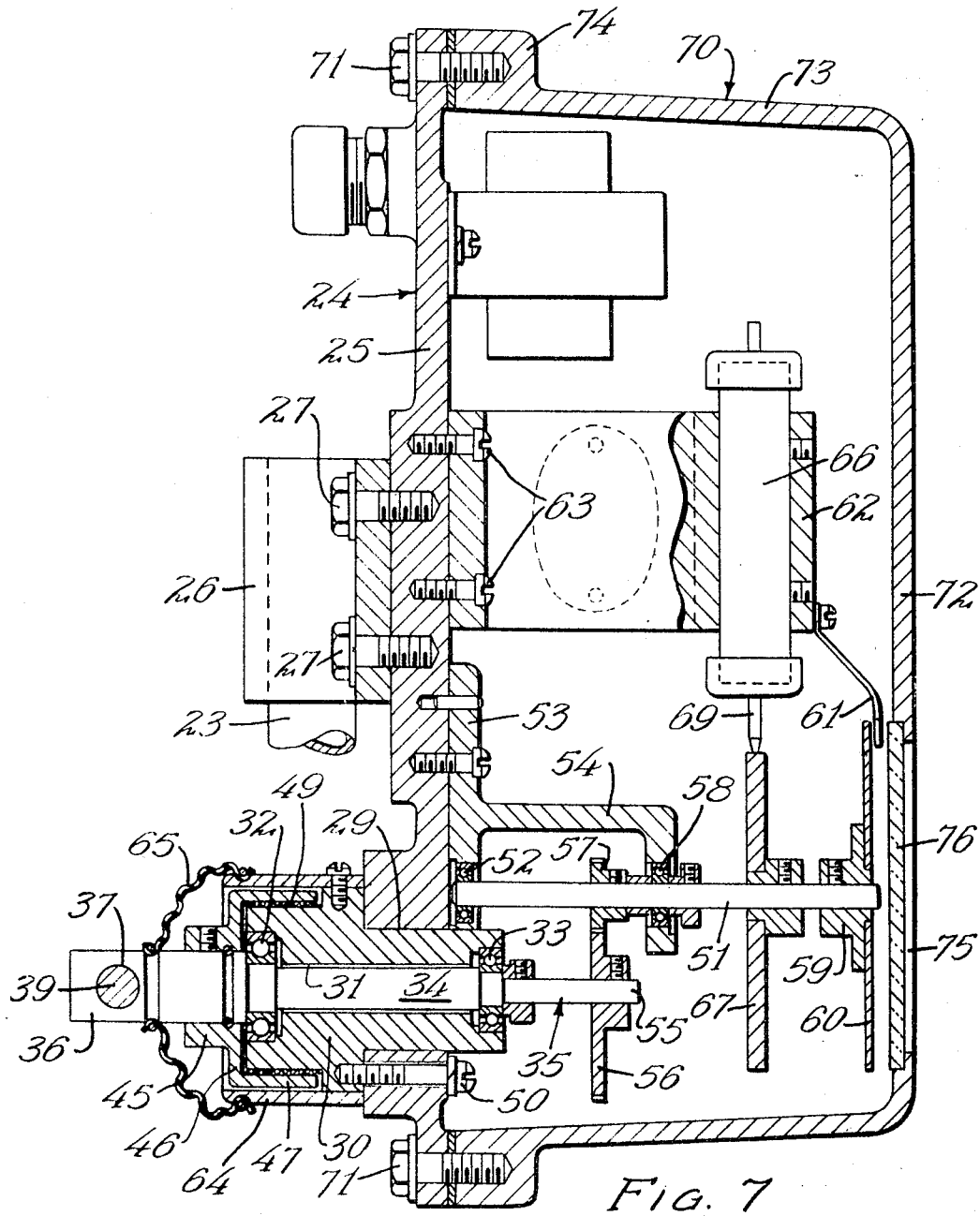
FIGURE 7 is an enlarged sectional view similar to FIGURE 6.

While the structures shown in FIGURES 5 and 6 have been given the same identifying numerals as the structures shown in FIGURE 7, the two structures are slightly different in construction. As will be noted, the hub 45, flange 46 and sleeve 47 have been omitted in FIGURE 6, and the rubber boot 77 connects the forward end 36 of the shaft 35 and the bearing support 30. In this construction the damping of the movements of the ski is accomplished by a variable resistor 79 supported on the mounting plate 25 and placed in the circuit to remove excess ripples caused by rapid movements of the ski supporting arm 39. It should be noted that the ski supporting arm 39, is provided with a counter weight 80 which virtually balances the arm and insures its accurate movement.

A card box 81 is supported on the inner surface of the mounting plate 25 and is designed to accommodate a series of up to 7 printed circuit boards which support the components of the circuit. The power supply, amplifier, and converter are provided on printed circuit boards in the card box 81. Furthermore, the alarm or control switches, as well as isolating amplifiers are also mounted in the card box as they are required.

FIGURE 8 illustrates in general an electrical diagram of the apparatus. The numeral 85 indicates a filter which is connected to the alternating current supply and which tends to eliminate variations therein. The filter 85 is connected to the linear variable differential transformer 66 which acts to vary the voltage in a linear relationship to the position of the ski 40. The figure illustrates the ski 40 mounted upon an arm 39 and operable to rotate the cam 67 which adjusts the position of the plunger 69 positioning the slug of the LVDT.

The output of the LVDT extends to the transmitter amplifier 86 which is powered by the power supply element 87. The transmitter amplifier amplifies the current and rectifies the current which forms the input to the transmitter indicated in general by the numeral 88. The transmitter 88 is a time impulse transmitter which produces uniformly timed pulses of a width depending on the incoming voltage. As an example, the transmitter produces a pulse signal every 90 milliseconds, the pulse being of a duration of from 15 to 75 milliseconds, and this span from 15 to 75 milliseconds represents from zero to one hundred percent of the signal. In other words, a pulse of 15 milliseconds would represent no flow condition while a pulse of 75 milliseconds would represent a one hundred percent flow condition.

The pulse output from the transmitter 88 is transmitted through a transmission line 89 to a receiver unit 90. The receiver unit transforms the pulse signal into a voltage which is proportional to the length of the pulses. This receiver then directs current to a suitable indication device which is capable of indicating the percentage of flow through the flume.

In some instances it is desirable to provide switches which are capable of opening and closing when certain conditions exist in the system. In this event, the current from the transmitter amplifier 86 is also directed through an isolation amplifier 91 to the electronic switches 92. If a separate indicator is desired, this may also be connected to the isolation amplifier, such a meter being indicated at 93. The purpose of the isolation amplifier is to prevent the operation of the switches or the indicating meter from affecting the signals being produced by the transmitter 88.

If condensation within the housing might be a problem, a thermostat such as 94 in FIGURE 5 of the drawings may control a heater 95 which maintains a temperature within the housing which is sufficient to prevent such condensation. These elements are obviously connected to the correct supply in the manner well known in the art.

In originally setting the apparatus, an arm 96 is bolted to a flat boss 97 on the flume section B. The arm 96 has a vertical stem 99 attached thereto which is preadjusted. The ski 40 is swung into contact with the lower end 100 of the stem 99, and the indicating dial 60 is adjusted relative to the fixed pointer 61 to provide a 60 percent flow reading on the dial 60. The arm 96 may then be removed and the ski will function to provide a zero percent to a 100 percent variation on the dial 60.

In accordance with the Patent Office statutes, I have described the principles of construction and operation of my improvement in In-Flume Transmitter, and while I have endeavored to set forth the best embodiment thereof, I desire to have it understood that changes may be made without departing from the spirit of my invention.

I claim:

1. A device for converting changes in liquid level of flow into voltage signals comprising in combination:
    an open flume through which the liquid is adapted to flow,
    a shaft pivotally supported on a horizontal axis fixed relative to said flume, said axis extending transversely of said flume,
    an arm secured to said shaft and having one end extending into said flume,
    a float sensor secured to said one end of said arm and adapted to rest upon liquid flowing through said flume, said arm being pivoted by variations of liquid level in said flume and causing corresponding rotation of said shaft,
    a cam mounted on said shaft,
    a linear variable differential transformer supported adjacent said cam and including a core engaging said cam for linear movement thereby upon pivotal movement of said cam,
    a power supply furnishing excitation voltage to said linear variable differential transformer, and means amplifying and rectifying the output of the linear variable differential transformer to produce an output proportional to the position of said core therein.

2. The structure of claim 1 and in which said float sensor includes a ski adapted to be flotational on the surface of liquid flowing through said flume.

3. The structure of claim 1 and in which said arm includes an overtravel stop.

4. The structure of claim 1 and in which a transmitter and box is connected to said linear variable differential transformer, at least one transmitter circuit board being in said box.

5. The structure of claim 4 and in which said circuit board is a printed circuit.

6. The structure of claim 1 and in which said means includes an amplifier card.

7. A device for converting changes in liquid level of flow into voltage signals comprising in configuration:
    an open flume through which liquid is adapted to flow,
    a shaft pivotally supported on a horizontal axis fixed relative to said flume, said axis extending transversely of said flume,
    an arm secured to said shaft and having one end extending into said flume,
    a float sensor including a ski secured to said one end of said arm and adapted to rise and fall upon variations of the level of liquid flowing through said flume the rising and falling of said one arm and causing pivotal movement of said shaft,
    a cam on said shaft,
    a linear variable differential transformer supported adjacent to said cam and having a core engaging said cam, said core moving in a linear direction upon pivotal movement of said cam,
    a power supply furnishing excitation voltage to said linear variable differential transformer to produce the linear movement of said core, and
    means amplifying and rectifying the output of the linear variable differential transformer.

8. A flow indicating transmitter for use with an open flume for converting changes in liquid level of flow into voltage signals comprising in combination:
    a transducer having a shaft pivotally supported on a horizontal axis fixed relative to said flume, said axis extending transversely of said flume,
    a sensor arm having one end extending into said flume,
    a ski sensor secured to said one end of said arm and adapted to be flotational on the surface of liquid flowing through said flume and to rise and fall with the level of said liquid,
    a cam mounted on said shaft and connected to said arm for pivotal movement in unison therewith,
    a linear variable differential transformer having a core engaging said cam for linear movement thereof upon pivotal movement of said cam,
    a power supply furnishing excitation voltage to said linear variable differential transformer,
    means amplifying and rectifying the output of the linear variable differential transformer to produce an output proportional to the position of said core, in said transformer, and
    a transmitter connected to said amplifying and rectifying means.

9. The structure of claim 8 and in which said transmitter output includes a series of pulses starting at a predetermined interval after the preceding pulse.

10. The structure of claim 9 and in which the width of each pulse is from 15 milliseconds to 90 milliseconds long and proportional to the flow in the flume.

References Cited

UNITED STATES PATENTS

| 1,611,480 | 12/1925 | Meroni | 73—313 X |
| 1,885,051 | 10/1932 | Smulski | 73—313 |
| 2,632,599 | 3/1953 | Hornfeck. | |

LOUIS R. PRINCE, Primary Examiner

D. O. WOODIEL, Assistant Examiner

U.S. Cl. X.R.

73—228, 308, 317